United States Patent [19]

Oh

[11] Patent Number: 5,610,776
[45] Date of Patent: Mar. 11, 1997

[54] METHOD OF OPTIMIZING READ CHANNEL OF DISK DRIVE RECORDING APPARATUS BY USING ERROR RATE

[75] Inventor: Heung-Min Oh, Suwon, Rep. of Korea

[73] Assignee: SamSung Electronics Co., Ltd., Suwon, Rep. of Korea

[21] Appl. No.: 386,906

[22] Filed: Feb. 8, 1995

[30] Foreign Application Priority Data

Apr. 27, 1994 [KR] Rep. of Korea .................... 1994-9013

[51] Int. Cl.$^6$ ....................................................... G11B 5/09
[52] U.S. Cl. ................................. 360/53; 360/46; 360/65
[58] Field of Search ................................. 360/46, 53, 65

[56] References Cited

U.S. PATENT DOCUMENTS

| | | | |
|---|---|---|---|
| 5,270,875 | 12/1993 | Shah et al. | 360/46 |
| 5,276,517 | 1/1994 | Matsuzawa et al. | 358/174 |
| 5,299,070 | 3/1994 | Takahashi et al. | 360/19.1 |
| 5,327,302 | 7/1994 | Khoury et al. | 360/65 |
| 5,341,249 | 8/1994 | Abbott et al. | 360/46 |
| 5,408,367 | 4/1995 | Emo | 360/77.05 X |
| 5,416,646 | 5/1995 | Shirai | 360/46 |
| 5,438,462 | 8/1995 | Cupolillo | 360/67 X |

*Primary Examiner*—W. C. Kim
*Attorney, Agent, or Firm*—Robert E. Bushnell, Esq.

[57] ABSTRACT

The present invention relates to a disk drive recording apparatus and more particularly to a method for optimizing performance of a read channel in a disk drive recording apparatus by using an error rate. The method for optimizing performance of a read channel in a disk driving recording apparatus having a programmable low-pass filter and a control device for controlling apparatus operation includes the steps of initially assigning a filtering characteristic to the programmable low-pass filter as a predetermined initial bandwidth value via the control device; detecting and evaluating data written on a predetermined track of a disk to calculate a first data detection error rate by the control device; comparing a reference error rate with the first data detection error rate; setting the filtering characteristic of the low-pass filter to a bandwidth indicating a lowest error rate by varying the bandwidth of the programmable low-pass filter when the first data detection error rate is greater than a reference error rate; thereafter, detecting data written on the predetermined track of the disk to calculate a second data detection error rate by the control device; comparing the reference error rate with the second data detection error rate; outputting an error state signal indicating that the disk drive recording apparatus is in an error state when the second data detection error rate is greater than the reference error rate; and setting a currently set bandwidth as a final set value and completing an optimization process when any one of the first and second data detection error rates is below the reference error rate.

18 Claims, 3 Drawing Sheets

METHOD OF OPTIMIZING READ CHANNEL OF DISK DRIVE RECORDING APPARATUS BY USING ERROR RATE

CROSS-REFERENCE TO RELATED APPLICATIONS

This application makes reference to, incorporates herein and claims all benefits accruing from our application earlier filed in the Korean Industrial Property Office on 27 Apr. 1994 of our application entitled *METHOD OF OPTIMIZING READ CHANNEL OF DISK DRIVING RECORDING APPARATUS BY USING ERROR RATE*, which application was duly assigned Ser. No. 9013/1994.

FIELD OF THE INVENTION

The present invention relates to a disk drive recording apparatus, and more particularly to a method for optimizing performance of a read channel in a disk drive recording apparatus by using an error rate.

BACKGROUND OF THE INVENTION

Data errors in a disk drive recording apparatus such as a hard disk drive are largely divided into "hard" errors caused by a disk defect and "soft" errors caused by a bit shift. Generally, hard errors are prevented by designating an error position as a bad sector in an initial step; however, since the error position can not be designated for soft errors, soft errors are regarded as an important problem to be solved to ensure operational reliability for the disk drive recording apparatus.

Another fundamental problem of the hard disk drive is its weakness for physical impact and shock. Head gimbals, which support a head, should be flexible so that the head is separated from the surface of a disk by a minute gap, which is maintained as the disk rotates. Since the head gimbals are flexible, impacts or shocks upon the hard disk drive can cause errors when data is being read from the disk.

One invention aimed at reducing such errors is disclosed in U.S. Pat. No. 5,327,302 entitled *Data Filter Tuning For Constant Density Recording Applications* issued to Khoury et al. on 5 Jul. 1994. In Khoury et al. '302, a tunable data filter is altered so that the filter cutoff frequency is substantially proportional to a predetermined factor of an incoming data frequency, thereby creating a desired eye opening in the read data. While this invention has merit in its own respect, I believe it can be improved upon to even further reduce error rates of read data.

SUMMARY OF THE INVENTION

Accordingly, it is an object of the present invention to provide an improved disk drive recording apparatus and method.

It is another object to provide a method which variably optimizes data detecting characteristics of a read channel in a disk drive recording apparatus in accordance with the characteristics of a disk and a head.

To achieve these and other objects, the present invention provides a method and apparatus for optimizing performance of a read channel in a disk driving recording apparatus having a programmable low-pass filter and a control device for controlling overall operation. The method includes the steps of initially assigning a filtering characteristic to the programmable low-pass filter as a predetermined initial bandwidth value via the control device; detecting and evaluating data written on a predetermined track of a disk to calculate a first data detection error rate via the control device; comparing a reference error rate with the first data detection error rate; setting the filtering characteristic of the low-pass filter to a bandwidth indicating a lowest error rate by varying the bandwidth of the programmable low-pass filter when the first data detection error rate is greater than a reference error rate; thereafter, detecting data written on the predetermined track of the disk to calculate a second data detection error rate via the control device; comparing the reference error rate with the second data detection error rate; outputting an error state signal indicating that the disk drive recording apparatus is in an error state when the second data detection error rate is greater than the reference error rate; and setting a currently set bandwidth as a final set value and completing an optimization process when any one of the first and second data detection error rates is below the reference error rate.

BRIEF DESCRIPTION OF DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
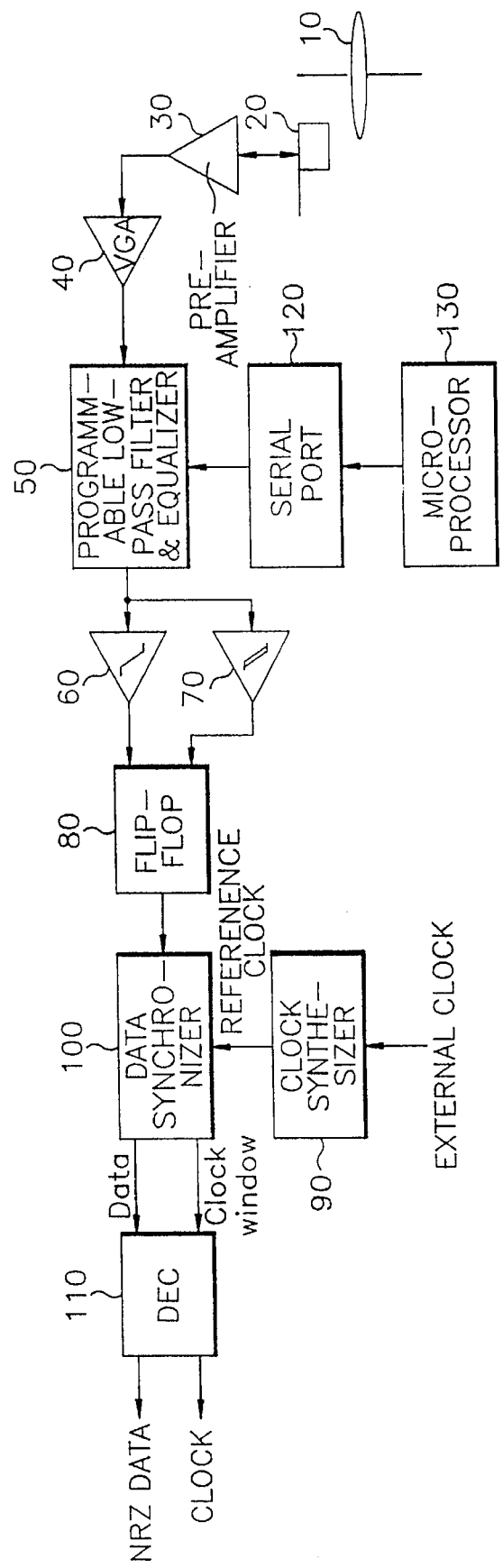
FIG. 1 is a block diagram showing construction of a read channel of read/write channel portion, of a representative hard disk drive.

FIG. 1 is a block diagram showing construction of a read channel of read/write channel portions of a representative hard disk drive. In FIG. 1, a head 20 outputs an analog signal induced from a disk 10. The analog signal is received, amplified and output at a given amplification level by a pre-amplifier 30. A variable gain amplifier 40 (hereinafter, referred to as VGA) controls amplification gain in accordance with variation of the input signal level received from pre-amplifier 30, thereby maintaining a constant output level. A programmable low-pass filter and equalizer 50 (hereinafter, referred to as programmable LPF and equalizer) removes noise from the signal output from VGA 40, compensates for the output signal, and narrows the pulse width in accordance with an input representative of a predetermined bandwidth and boost level. A zero-crossing comparator 60 differentiates an input signal received from programmable LPF and equalizer 50 and then outputs a differentiated signal. A hysteresis comparator 70 sets a signal threshold level and compares the signal threshold level with the level of the output signal received from programmable LPF and equalizer 50, thereby outputting a compared result. A flip-flop 80 receives outputs from zero-crossing comparator 60 and hysteresis comparator 70 and generates one shot data. A clock synthesizer 90 produces a reference clock pulse by receiving a predetermined external clock pulse. A data synchronizer 100 receives the one shot data output from flip-flop 80, and transmits the data and a clock window signal in synchronism with the reference clock pulse from clock synthesizer 90. A decoder 110 decodes the data and clock window signal received from data synchronizer 100 and outputs the decoded data as no-return-to-zero NRZ data. A serial port 120 receives a signal representative of the predetermined bandwidth and boost level from a microprocessor 130, and then transmits the signal to programmable LPF and equalizer 50. Microprocessor 130 controls the overall operation of the hard disk drive and outputs an initial bandwidth value and boost level data.

Figure 2:
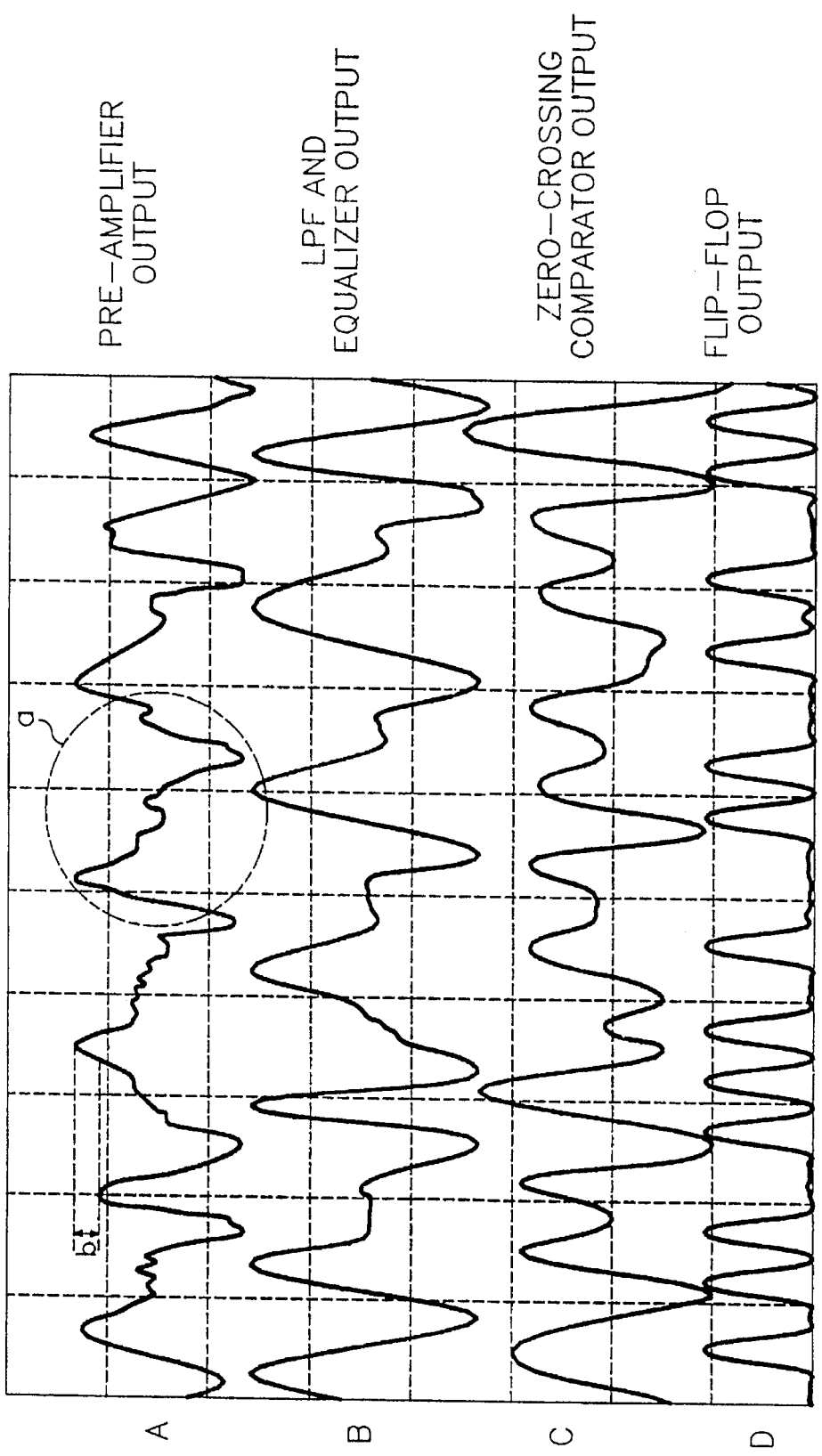
FIG. 2 is a waveform diagram showing output states of each component in FIG. 1.

FIG. 2 is a waveform diagram illustrating output states of each component in FIG. 1. An explanation of the operation of the read channel in the hard disk drive will hereinafter be given with reference to FIGS. 1 and 2.

An electrical signal induced from a surface of disk 10 by head 20 typically has a weak voltage of about 250 µV. Differences in signal voltage may be generated depending upon a flying height between disk 10 and head 20, and the quality of disk 10 and head 20. Pre-amplifier 30 receives the signal from head 20, amplifies the signal, and outputs the signal at an amplification rate of about 300 times, as shown in waveform "A" of FIG. 2. In this case, however, since noise is also amplified, the output state of pre-amplifier 30 represents an unstable output waveform, such as portion "a" indicated in FIG. 2.

VGA 40 receives the output signal from pre-amplifier 30 and varies amplification gain in accordance with variations of the input signal level, as shown in portion "b" indicated in FIG. 2, to output a signal at a constant level.

Next, programmable LPF and equalizer 50 initially establishes the bandwidth and boost level according to data received from microprocessor 130 via serial port 120. Programmable LPF and equalizer 50 filters, compensates and narrows the pulse width of the output signal from VGA 40, thereby producing a stabilized analog signal, as shown in waveform "B" of FIG. 2.

Zero-crossing comparator 60 differentiates the signal output from programmable LPF and equalizer 50 to generate a differentiated output signal, as shown in waveform "C" of FIG. 2. Hysteresis comparator 70, using a predetermined signal threshold level, compares the signal threshold level with the level of the signal output from programmable LPF and equalizer 50 to generate a compared result signal in which the peak of the signal output from programmable LPF and equalizer 50 is detected.

Flip-flop 80, which receives the differentiated output signal from zero-crossing comparator 60 and the compared result signal from hysteresis comparator 70, generates digital signals in a pulse pattern, as shown in waveform "D" of FIG. 2. Data synchronizer 100 receives the digital signals and transmits the clock window signal and the digital signals in synchronization with the reference clock pulse from clock synthesizer 90. Decoder 110 receives the clock window signal and digital signals from data synchronizer 100, decodes the signals and then generates the decoded signals as NRZ data.

When executing a data read operation with the hard disk drive, however, signal qualities are different from each other due to magnetic, electrical, and mechanical characteristics of disk 10 and head 20. As a result, soft data errors such as an extra pulse or a missing pulse may occur. A soft data error generated by an extra pulse is attributable to general noises, while a soft data error generated by a missing pulse is attributable to a bit shift. The general noises causing an extra pulse include white noise, head noise, electric current noise, voltage noise, damping resistance noise, disk noise, PCB noise, and pre-amplifier noise. Soft data errors generated by an extra pulse can be removed by using an error correction code.

Bit shifts often result from peak shifts attributable to patterns and noise. Peak shifts attributable to noise can be remedied by adjusting the bandwidth of the low-pass filter. Peak shifts attributable to patterns resulting from mutual interference between adjacent signals can be remedied by compensating a signal using an equalizing circuit and narrowing the pulse width of the signal in order to minimize mutual interference between adjacent signals.

As discussed above, peak shifts due to patterns can be remedied by increasing a boost level, whereas peak shifts due to noise may be remedied by an extension of the bandwidth of the low-pass filter. Hence, a trade-off is necessary between the boost level and the bandwidth of the low-pass filter. Furthermore, since the quality of disk 10 and head 20 is variable to a large extent during the process, optimization of bandwidth of the low-pass filter and boost level of the equalizing circuit is necessary for each disk and head.

In conventional methods, however, bandwidth of the low-pass filter and boost level of the equalizing circuit are fixed. Therefore, each read channel can not be utilized optimally to keep pace with the characteristic variations of disk 10 and head 20; accordingly, a missing pulse may occur during the data read operation.

One characteristic of a soft data error in a hard disk drive is that error generation probability varies in accordance with test conditions because of errors due to a bit shift, unlike hard errors due to a disk defect. Accordingly, in a preferred embodiment of the present invention, the error rate is checked while the test conditions are established to reflect a worst case scenario. As a result, the bandwidth and boost level for optimizing performance of the read channel are obtained, based upon the checked error rate.

In addition to error rate calculation methods for optimizing performance of the read channel, the preferred embodiment of the present invention uses a method for calculating a raw error rate for use as a judgement reference to ensure reliability.

Moreover, since an off-track read/write state changes according to the stability of the servo control system, the error rate is intended to be produced under a maximum off-track state.

Figure 3:
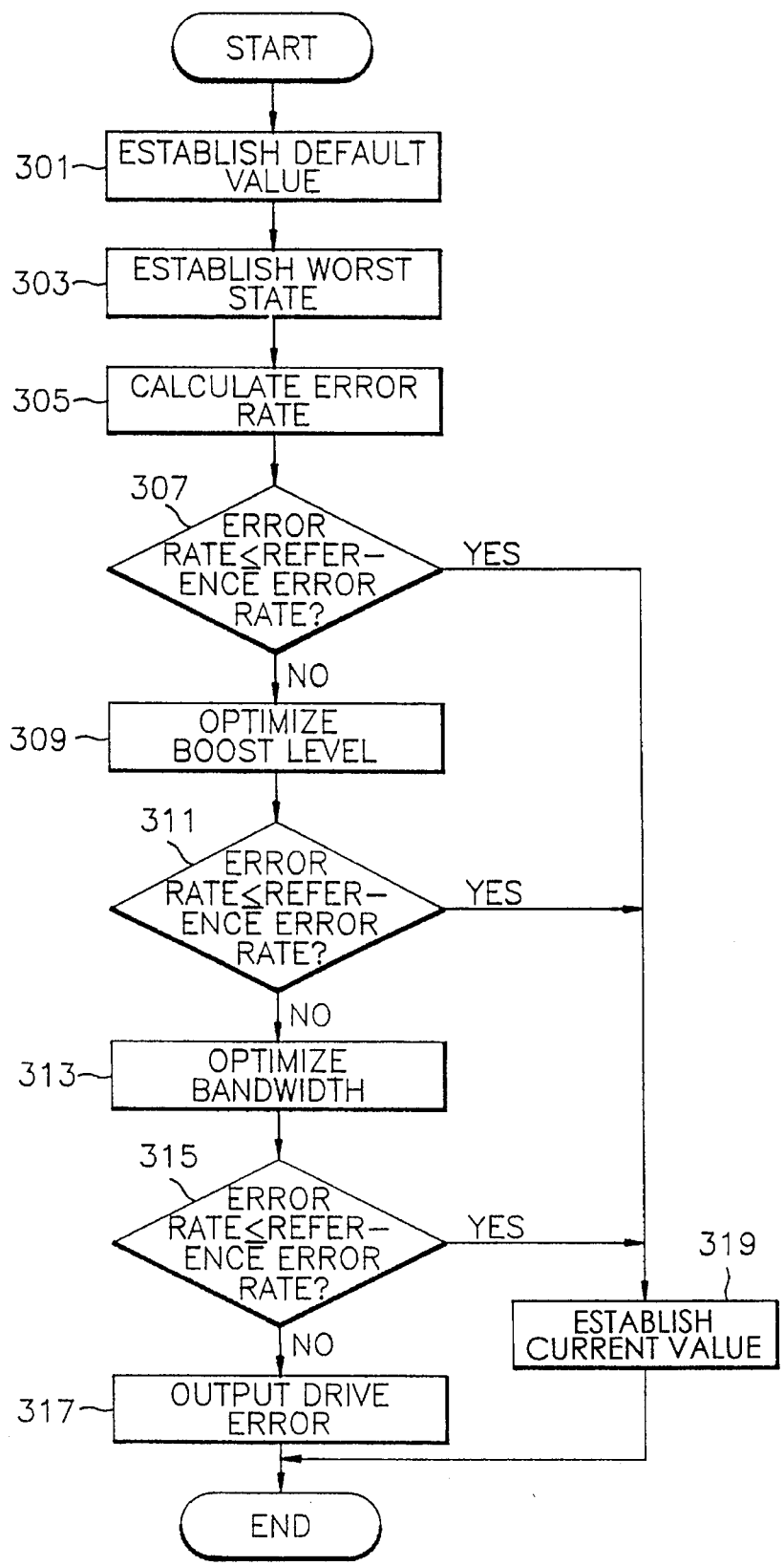
FIG. 3 is a flow chart showing a process according to the present invention for optimizing performance of a read channel of a disk drive recording apparatus by using an error rate.

FIG. 3 is a flow chart showing a process according to the present invention for optimizing performance of a read channel of a disk drive recording apparatus by using an error rate. An operation of the preferred embodiment of the present invention will now be discussed with reference to FIG. 3.

In step 301, microprocessor 130 outputs a default value for the bandwidth of the read channel and the boost level previously established by a manufacturer in order to set programmable LPF and equalizer 50. To execute the above operation, microprocessor 130 sets the default value by providing data to programmable LPF and equalizer 50 via serial port 120.

In step 303, microprocessor 130 selects an inner track of disk 10 where minimal hardware errors exist, writes optional data under a worst state condition and establishes an off-track level for executing a data detection operation.

In step 305, microprocessor 130 determines an error rate by repeating a read operation to detect a small amount of data on the selected track. The read operation is not performed to use the error correction code or to retry a read operation. Furthermore, if more than one head exists, an error rate is calculated by an identical method for each respective head.

In step 307, microprocessor 130 compares the error rate calculated in step 305 with a reference error rate. When the calculated error rate is less than or equal to the reference error rate, microprocessor 130 designates the default value as an optimization value for each head in step 319, and completes a routine for optimizing performance of the read channel.

In steps 305 and 307, microprocessor 130 in the preferred embodiment of the present invention evaluates $10^{10}$ bits of data through each head to calculate a data error rate. In this case, the reference error rate is established as $1/10^{10}$.

In step 307, when the calculated error rate is greater than the reference error rate, microprocessor 130 sequentially varies the boost level of programmable LPF and equalizer 50 at step 309 and calculates the error rate of a corresponding head. As a result, the boost level corresponding to the lowest error rate is established as an optimization level.

At step 311, when the calculated error rate is greater than the reference error rate, microprocessor 130 sequentially varies the bandwidth of programmable LPF and equalizer 50 at step 313 and calculates the error rate of a corresponding head. As a result, the bandwidth corresponding to the lowest error rate is established as an optimization level.

At step 315, microprocessor 130 again repeats the operation of step 307. Here, when the calculated error rate is below or equal to the reference error rate, microprocessor 130 designates the currently established boost level and bandwidth for each head as an optimization level at step 319, and completes the routine for optimizing performance of the read channel.

At step 315, however, when the calculated error rate is greater than the reference error rate, microprocessor 130 establishes a drive error state indicative of poor quality of head 10 or the drive in step 317. In this case, an output means, for instance, a host computer indicating a drive test s processing state may be used as an output device for indicating the drive error state. Performance of the read channel can be optimized by adjusting the characteristics of all of the low-pass filters LPFs and equalizers; but it is also possible that, after one low-pass filter LPF and equalizer is set to an established reference value, the read channel may be optimized by varying the characteristics of the other components. In other words, the read channel can be optimized by variably setting the remaining low-pass filters LPFs and equalizers in dependence upon the first established reference values, thereby eliminating multiple performances of steps 309 and 313.

As discussed above, in a disk drive recording apparatus such as a hard disk drive, the present invention is provided with a method for optimizing the performance of a read channel of the disk drive recording apparatus by variably setting the frequency bandwidth and boost level of the read channel in accordance with characteristics of the disk and head.

While the invention has been particularly shown and described with reference to a preferred embodiment, it will be understood by those skilled in the art that modifications in detail may be made without departing from the spirit and scope of the invention. By way of example, a microprocessor of a disk drive recording apparatus used to perform and control an optimizing processing routine may be replaced with test equipment of the disk drive recording apparatus.

What is claimed is:

1. A method for optimizing performance of a read channel in a disk drive recording apparatus having a programmable low-pass filter and control means for controlling operation of said apparatus, said method comprising the steps of:

setting a filtering characteristic of said programmable low-pass filter to a predetermined initial bandwidth value via said control means;

detecting data written on a predetermined track of a disk to calculate a first data detection error rate via said control means, and comparing a reference error rate with said first data detection error rate;

setting said filtering characteristic of said programmable low-pass filter to a bandwidth value indicating a lowest error rate by varying said bandwidth value of said programmable low-pass filter when said first data detection error rate is greater than said reference error rate;

detecting data written on said predetermined track of the disk to calculate a second data detection error rate via said control means, and comparing said reference error rate with said second data detection error rate;

outputting an error state signal indicating that said disk drive recording apparatus is in an error state when said second data detection error rate is greater than said reference error rate; and setting a current bandwidth value as a final set value when any one of said first and second data detection error rates is less than or equal to said reference error rate.

2. The method as claimed in claim 1, wherein said disk drive recording apparatus comprises a hard disk drive.

3. The method as claimed in claim 2, wherein said predetermined track comprises an inner track of the disk where a minimum hardware error rate exists.

4. The method as claimed in claim 1, wherein said predetermined track comprises an inner track of the disk where a minimum hardware error rate exists.

5. A method for optimizing performance of a read channel of a disk drive recording apparatus having an equalizer and control means for controlling operation of said apparatus, said method comprising the steps of:

setting a performance characteristic of said equalizer to a predetermined boost level via said control means;

detecting data written on a predetermined track of a disk to calculate a first data detection error rate via said control means, and comparing a reference error rate with said first data detection error rate;

setting said performance characteristic of said equalizer to a boost level indicating a lowest error rate by varying said boost level of said equalizer when said first data detection error rate is greater than said reference error rate;

detecting data written on said predetermined track of the disk to calculate a second data detection error rate via said control means, and comparing said reference error rate with said second data detection error rate;

outputting an error state signal indicating that said disk drive recording apparatus is in an error state when said second data detection error rate is greater than said reference error rate; and setting a current boost level as a final set value and completing said optimizing method when any one of said first and second data detection error rates is less than or equal to said reference error rate.

6. The method as claimed in claim 5, wherein said disk drive recording apparatus comprises a hard disk drive.

7. The method as claimed in claim 6, wherein said predetermined track comprises an inner track of the disk where a minimum hardware error rate exists.

8. The method as claimed in claim 5, wherein said predetermined track comprises an inner track of the disk where a minimum hardware error rate exists.

9. A method for optimizing performance of a read channel of a disk drive recording apparatus having a programmable low-pass filter, an equalizer, and control means for controlling operation of said apparatus, said method comprising the steps of:

setting a filtering characteristic of said programmable low-pass filter to a predetermined initial bandwidth value and setting a boost level of said equalizer to an initial value via said control means;

detecting data written on a predetermined track of a disk to calculate a first data detection error rate via said control means, and comparing a reference error rate with said first data detection error rate;

setting said equalizer to said boost level indicating a lowest error rate by varying said boost level of said equalizer when said first data detection error rate is greater than said reference error rate;

detecting data written on said predetermined track of the disk to calculate a second data detection error rate via said control means, and comparing said reference error rate with said second data detection error rate;

setting said filtering characteristic of said programmable low-pass filter to a bandwidth value indicating a lowest error rate by varying said bandwidth value of said programmable low-pass filter when said second data detection error rate is greater than said reference error rate;

detecting data written on said predetermined track of the disk to calculate a third data detection error rate via said control means, and comparing said reference error rate with said third data detection error rate;

outputting an error state signal indicating that said disk drive recording apparatus is in an error state when said third data detection error rate is greater than said reference error rate; and setting a current bandwidth and a current boost level as final set values and completing said optimizing method when any one of said first, second and third data detection error rates is less than or equal to said reference error rate.

10. The method as claimed in claim 9, wherein said disk drive recording apparatus comprises a hard disk drive.

11. The method as claimed in claim 10, wherein said predetermined track comprises an inner track of the disk where a minimum hardware error rate exists.

12. The method as claimed in claim 9, wherein said predetermined track comprises an inner track of the disk where a minimum hardware error rate exists.

13. A method for optimizing performance of a read channel of a disk drive recording apparatus comprising a programmable low-pass filter and an equalizer, said apparatus connected to an external control device for controlling operation of said apparatus, said method comprising the steps of:

setting a filtering characteristic of said programmable low-pass filter to a predetermined initial bandwidth value and setting a boost level of said equalizer to an initial value via said control device;

detecting data written on a predetermined track of a disk to calculate a first data detection error rate via said control device, and comparing a reference error rate with said first data detection error rate;

setting a characteristic of said equalizer to said boost level indicating a lowest error rate by varying said boost level of said equalizer when said first data detection error rate is greater than said reference error rate;

detecting data written on said predetermined track of the disk to calculate a second data detection error rate via said control device, and comparing said reference error rate with said second data detection error rate;

setting said filtering characteristic of said programmable low-pass filter to a bandwidth indicating a lowest error rate by varying said bandwidth of said programmable low-pass filter when said second data detection error rate is greater than said reference error rate;

detecting data written on said predetermined track of the disk to calculate a third data detection error rate via said control device, and comparing said reference error rate with said third data detection error rate;

outputting an error state signal indicating that said disk drive recording apparatus is in an error state when said third data detection error rate is greater than said reference error rate; and setting a current bandwidth and a current boost level as final set values and completing said optimizing method when any one of said first, second, and third data detection error rates is less than or equal to said reference error rate.

14. The method as claimed in claim 13, wherein said disk drive recording apparatus comprises a hard disk drive.

15. The method as claimed in claim 14, wherein said predetermined track comprises an inner track of the disk where a minimum hardware error rate exists.

16. The method as claimed in claim 13, wherein said predetermined track comprises an inner track of the disk where a minimum hardware error rate exists.

17. A disk drive apparatus, comprising:

first means for exhibiting a bandwidth value and a boost level used to process electrical signals in said disk drive apparatus;

second means for reading data from an inner track of a disk driven by said disk drive apparatus; and third means for calculating a first data error rate from said data read by said second means from said inner track of said disk and comparing said first data error rate with a reference error rate, said third means adjusting said boost level exhibited by said first means and then calculating a second data error rate from said data read by said second means from said inner track of said disk and comparing said second data error rate with said reference error rate when said first data error rate is greater than said reference error rate, said third means adjusting said bandwidth value exhibited by said first means and then calculating a third data error rate from said data read by said second means from said inner track of said disk and comparing said third data error rate with said reference error rate when said second data error rate is greater than said reference error rate, said third means indicating an error state of said disk drive apparatus when said third data error rate is greater than said reference error rate and controlling said first means to exhibit said boost level and said bandwidth value according a current state when any one of said first, second and third data error rates is not greater than said reference error rate.

18. The disk drive apparatus as claimed in claim 17, wherein said first means comprises a programmable low pass filter and equalizer.

* * * * *

UNITED STATES PATENT AND TRADEMARK OFFICE
CERTIFICATE OF CORRECTION

PATENT NO.   : 5,610,776
DATED        : Mar. 11, 1997
INVENTOR(S)  : Heung-Min Oh It is certified that error appears in the above-indentified patent and that said Letters Patent is hereby corrected as shown below:

Column 2,   Line 35,   after "FIG. 1; and", start a new paragraph with "FIG. 3 is a ..."

Column 5,   Line 41,   before "processing", delete "s".

Signed and Sealed this

Tenth Day of June, 1997

*Attest:*

BRUCE LEHMAN

*Attesting Officer*     Commissioner of Patents and Trademarks